United States Patent [19]

Kuehl

[11] Patent Number: 4,625,857
[45] Date of Patent: Dec. 2, 1986

[54] ENDLESS BELT CONVEYOR SYSTEM HAVING PATTERNED BELT TRANSPORT SURFACE

[75] Inventor: Guenther L. Kuehl, Greenwich, Conn.

[73] Assignee: Z-Loda Corporation, New Canaan, Conn.

[21] Appl. No.: 773,049

[22] Filed: Sep. 6, 1985

[51] Int. Cl.$^4$ ............................................. B65G 37/00
[52] U.S. Cl. ............................... 198/465.1; 198/469.1; 198/699; 414/235; 414/257
[58] Field of Search ............. 198/465.1, 469.1, 803.01, 198/697, 698, 699, 572; 104/165; 414/235, 239, 241, 253, 257

[56] References Cited

U.S. PATENT DOCUMENTS 2,047,347  7/1936  Wheelock ..................... 414/253 X
2,656,940  10/1953  Sumners et al. .................... 414/257
3,443,838  5/1969  Jung ........................... 198/803.01 X Primary Examiner—Joseph E. Valenza
Assistant Examiner—Jonathan D. Holmes

[57] ABSTRACT

An endless belt conveyor system has patterned belt transport surface for engaging loads having spaced protrusions on their bottom surfaces, such as, for example, multi-wheeled carts. The endless belt is trained over a pair of rollers, and has a plurality of nesting elements on its transport surface designed to match and engage the protrusions on the bottom of the loads. As each approaching load is identified, the belt speed is controlled so that the nesting elements on the belt surface engages the protrusions on the loads for securely engaging the loads during their transportation from one station to another. Different patterned belt transport surfaces are provided for engagements of the different protrusions of the loads with corresponding nesting elements on the surface of the belt during the transportation of the load.

14 Claims, 4 Drawing Figures

4,625,857

ENDLESS BELT CONVEYOR SYSTEM HAVING PATTERNED BELT TRANSPORT SURFACE

FIELD OF THE INVENTION

The present invention relates generally to conveyors and particularly to conveyors for the transportation of objects or loads with bottom surfaces having spaced protrusions or wheeled carts having spaced casters. More specifically, this invention is concerned with endless belt conveyors with "patterned" outer surfaces designed to engage the loads during their transportation from one station to another.

BACKGROUND OF THE INVENTION

Numerous types of conveyors are used for transportation of a variety of articles or workpieces from one station to another. Notable among such conveyors are the endless belt conveyor systems which have found widespread use in factories, airports, restaurants, post offices, and industrial plants. An endless belt conveyor system typically includes a flat driven belt trained over a pair of rollers. The articles to be transported are usually carried directly on the surface of the belt or in article carriers such as cartons, boxes, trays, and the like which are removeably placed on the flat conveyor belts.

By way of illustration of the different types of conveyor systems, reference may be had to the following patents: U.S. Pat. Nos. 1,487,326 (Fuller); 3,146,874 (McGow et al); 3,650,373 (Kern et al); 3,708,057 (Hardwig); 4,032,001 (Hild); 4,056,063 (Ritter), 4,088,220 (Jacksch); 4,227,609 (Gunther et al) and 4,279,337 (Kachnick). While this list is by no means exhaustive, it is representative of the different conveyor systems used to transport diverse types of loads.

When it is desired to transport carts mounted on wheels, for example, the conveyor system must be particularly adapted to engage the wheels or casters of the carts in a selective and synchronized manner in order to accommodate carts of various sizes. So far as it is known, the conveyor systems which are presently used are not well suited for transportation of such loads. Accordingly, there is a need for conveyor systems which can selectively engage the wheels and transport such wheel carts regardless of their size and number of casters on each cart.

SUMMARY OF THE INVENTION

The conveyor of the present invention is adapted to engage and transport loads having spaced protrusions on their bottom surfaces. The protrusions may be, for example, casters, wheels, or bumps. The spacing and numbers of the protrusions differ from one load to the other, for example, the first load may be a four-wheeled cart and the next load may be a six-wheeled cart.

An endless and flexible conveyor belt is mounted on a driving roller and is trained (carried) over a driven roller. The belt has, on its outer transport surface, a plurality of nesting means, such as buckets, which form a plurality of patterns, which match the various spacing and number of protrusions on the loads. For example, to match the loads of both four-wheeled carts and six-wheeled carts, the belt will have four spaced buckets to return the four-wheeled carts and six spaced buckets to return the six-wheeled carts.

An operator, or an automatic control device, will sense the type of load which is approaching the belt and rotate the belt so that its pattern will match the pattern on the load. For example, if the operator sees that the next load is a four-wheeled cart, he will operate the conveyor belt so that it rotates until its loading nesting means match the front (forward) protrusions of the load. The operator will rotate the belt until the front two buckets of the four-wheel pattern is in position to engage and retain the front two wheels of the four-wheeled carts during their transportation from one station to another station.

BRIEF DESCRIPTION OF THE DRAWINGS

In the drawings wherein like reference numerals are employed to designate like parts.

DETAILED DESCRIPTION OF THE INVENTION

In order to accommodate the transportation of wheeled carts of different sizes having varying numbers of wheels or casters, the present invention provides a unique conveyor system having a "patterned" outer conveyor surface adapted for selective engagement with, and transportation of, carts as hereinafter described. In accordance with this invention, the conveyor surface is provided with nesting means, such as receptacles, slats, cleats, buckets or the like, which are spaced apart on the surface and which are adapted to engage the wheels or casters of the carts in order to transport the carts along the conveyor belt surface.

Figure 1:
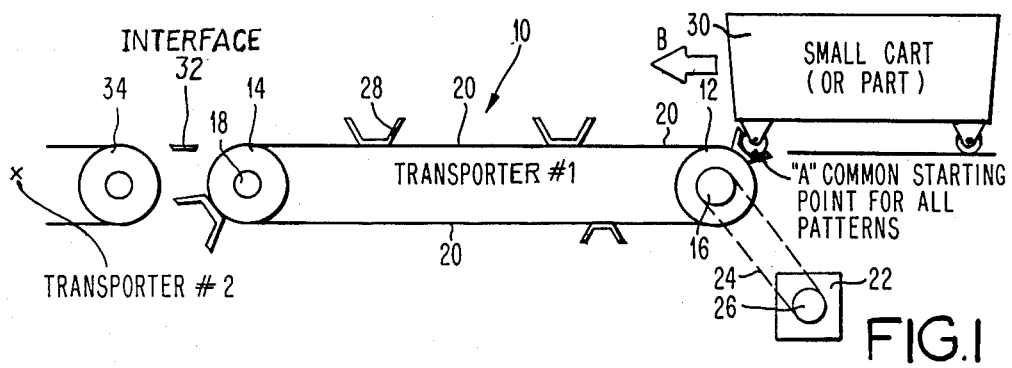
FIG. 1 is a side elevational view of an endless conveyor belt system in accordance with the present invention wherein the conveyor belt surface is patterned for a transportation mode preselected to transport 2-wheeled carts.

In order to facilitate understanding of the conveyor system of the present invention, and the manner of its operation, reference is made to the drawings, and first to FIG. 1 showing a conveyor system generally designated as 10. The conveyor system shown in FIG. 1 includes a pair of spaced apart rollers; a drive roller 12 and a driven roller 14 rotating about their respective pulleys 16 and 18. Although only two rollers are shown in the drawings, any number of additional rollers may be used, if necessary.

An endless flexible belt 20 is trained over the rollers 12 and 14 and travels in the direction of the arrow B during transportation of the load. The rotational speed of the rollers 12 and 14, and hence the speed of travel of the endless belt 20, may be controlled by any number of means such as by a cam box 22, or any other known means such as proximity switch, photo switches and the like. As is shown in FIG. 1, the rotational speed of the drive roller 12 is controlled by the cam box 22 which includes a chain or belt 24 coupling the pulley 26 of the cam box to the drive roller 12.

The load-carrying surface of the endless belt 20 is patterned to carry a plurality of spaced apart nesting means 26 for engaging the wheels or casters of a cart or load. As it was previously mentioned, the nesting means 28 may be any appropriately configured receptacle, slat, cleat, or buckle and the like in which the wheels or casters of the load may be nested or securely engaged during transportation of the load. The nesting means 28 may be formed integrally with the belt surface or they may be fixed thereto mechanically, or by some other suitable means, at spaced apart distances thereby providing a patterned surface.

In order to facilitate understanding of the conveyor system of the present invention, reference will now be made to the operation of the system with particular reference to the drawings. Once again referring to FIG. 1, a load, e.g., a two-wheeled cart 30 is seen at the loading station ready to be loaded at station "A" on the conveyor system (transporter No. 1). The operator can activate the conveyor system and preselects the appropriate patterned surface for transporting the cart. As a nesting means reaches station A, the operator pushes the cart 30 so as to engage the front wheels or casters of the cart into that nesting means. The operator preselects the speed of the endless belt 20 by preselecting the speed of the drive roller 12 so as to synchronize movements of the next nesting means in a predetermined and orderly manner. Accordingly, as the front casters of the cart 30 are engaged into the nesting means 28 at station A, the cart is transported in the direction of the arrow B. Next, the rear casters of the cart 30 engage the next nesting means as the next nesting means reaches loading station A and the cart is thus transported by the endless belt from station A in the direction of arrow B toward the driven roller 12 where it may be unloaded, or further transported via a second and similar conveyor system (transporter No. 2) to another station, and so on, until the cart reaches its desired destination.

It is thus seen that by proper preselection of the speed of the conveyor system and synchronization of the nesting means on the endless belt with the approaching carts, the two-wheeled carts can be transported on a patterned surface (pattern I) of the endless belt, whereby successive nesting means engage the front and rear casters of each cart during transportation of the carts from one station to another.

If it is desired to transport the carts to a second conveyor system, an interface plate 32 is provided to bridge the space between transporter No. 1 and transporter No. 2. The interface plate 32 provides a surface over which the cart may travel (e.g., by pushing or sliding, or by the carts own speed and momentum.) Transporter No. 2 is conveniently positioned next to transporter No. 1, with the drive roller 34 of transporter No. 2 defining sufficient clearance with the driven roller 14 of transporter No. 1 so as to provide an unobstructed path for the movements of the nesting means 28 on the endless belt 20. Otherwise, the construction of transporter No. 2 is the same as transporter No. 1 and therefore will not be described in further detail.

Figure 2:
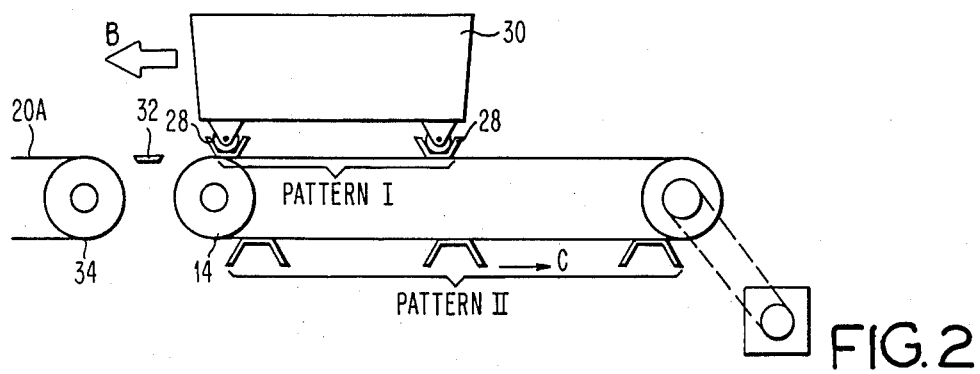
FIG. 2 is a side elevational view similar to FIG. 1 illustrating the transportation of 2-wheeled carts.
Figure 3:
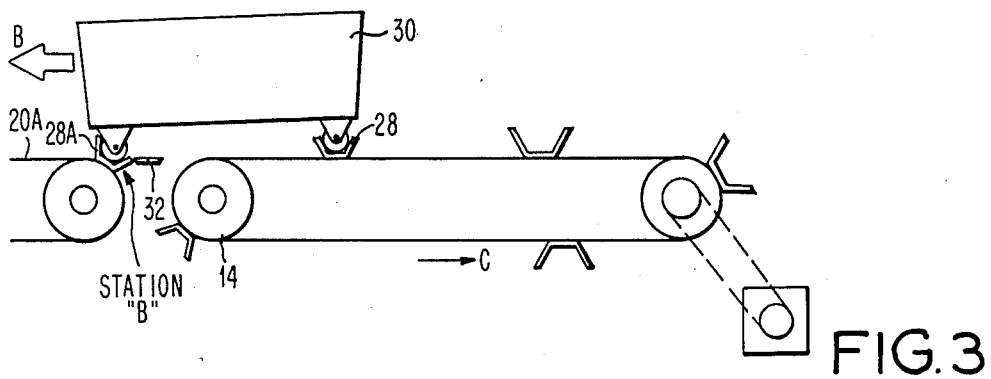
FIG. 3 is a side view similar to FIG. 2 illustrating the manner of transfer of the cart from one conveyor system to an adjacent conveyor system.

As shown in FIGS. 2 and 3, as the cart 30 reaches the driven roller 14, the cart will be in position for sliding over the interface plate 32 onto transporter No. 2 wherein the front casters of the cart disengage from the nesting means 28 of transporter No. 1 and nest in the nesting means 28A on the endless belt 20A of the transporter No. 2. The disengaged nesting means 28 on the endless belt 20 of transporter No. 1 continues its travel, this time in the direction of the arrow C as shown in FIG. 2. The speed of travel of the endless belts 20 and 20A are preselected and synchronized so as to engage the nesting means 28, 28A into the casters of the cart 30 at station A (FIG. 1) and station B (FIG. 3) during transfer of the load. Orderly loading and transportation of the carts are thus assured until the load reaches its desired destination.

Figure 4:
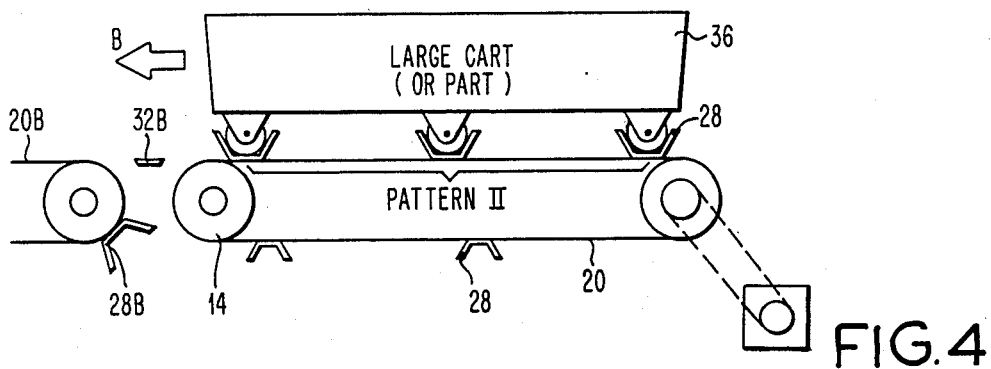
FIG. 4 is a view similar to FIG. 2 but illustrating a conveyor belt surface patterned for a transportation mode preselected to transport 3-wheeled carts.

The foregoing operation is continued by the operator so long as only 2-wheeled carts are being transported from one station to another. If, however, it is desired to transport 3-wheeled carts, the operation is basically the same as hereinbefore described except that the operator brings a second patterned surface (Pattern II) of the endless belt 20, 20A, etc. to the loading (starting) point. Thus, by selecting a different starting point for the endless belt, a different synchronization is effected between the successive nesting means 28 and the front, middle and rear casters of the 3-wheeled cart 36 and the transport surface of the endless conveyor belt will be as shown in FIG. 4. As described in connection with FIGS. 1–3, the cart 36 may be unloaded when it reaches the driven roller 14 or it may be further transported via interface plate 32B to transporter No. 2 in the same manner hereinbefore described.

In the foregoing description, the identification of the loads and their transportation were described by reference to a manual operation, with the operator observing each cart as it approaches the station "A" and selecting the patterned surface designed for transportation of the particular load. However, the conveyor system of this invention is readily amenable to automatic operation. When operated automatically, the movements of the carts approaching station A may be computerized and a bar code scanner or similar means may be used to identify of "read" the type of cart approaching station A. Once the type of cart is identified or "read" a signal means is transmitted to the cam box, etc., to select the proper conveyor starting point so that the conveyor's nesting means matches the casters on the carts. The cart is thus pushed in so that its casters are nested into the nesting means at station A and the cycle continues with the appropriate patterned transport surface for each particular load.

The conveyor system of the present invention may be used for transportation of loads in either direction on a horizontal surface, inclined surface, or vertical surface. During their transportation, the carts are stable and secure in position because of the nesting engagement of the casters into the nesting means. Accordingly, the present invention affords a unique and convenient system for the transportation of wheeled carts in a variety of industries.

From the foregoing detailed description and the drawings, several changes and modifications suggest themselves both in the construction and operation of the conveyor system. Such changes and modifications are obvious to those skilled in the art and are within the scope of the present invention.

What is claimed is:

1. A conveyor system for the transportation of loads from a first station to a second station, in which some of the loads have a first pattern of bottom protrusions and some of the loads have a different second pattern of bottom protrusions, with each load bottom having forward and rear protrusions, said conveyor system comprising:

(a) an endless belt having an outer transport surface, a drive roller and a driven roller, said belt being trained over said rollers;
 (b) a plurality of spaced-apart nesting means affixed to said belt transport surface, said nesting means forming first and second patterns corresponding, respectively, to said first and second patterns of bottom protrusions of said loads, and (c) control means for controlling said drive roller to advance said belt to a selected pattern so that, at a first station, forward nesting means of the selected pattern on said belt will engage and carry the forward protrusions of said load and, upon further advance of said belt, the rear nesting means of said selected pattern will engage and carry the rear protrusions of said load.

2. A conveyor system as in claim 1 wherein said loads have bottom surfaces with forward and rear fixed protrusions adapted for engagement into said nesting means.

3. A conveyor system as in claim 1 wherein said loads are wheeled carts and wherein the wheels of said carts define the protrusions which nest into said nesting means.

4. A conveyor system as in claim 1 wherein said nesting means are buckets, slats, or cleats.

5. A conveyor system as in claim 2 wherein said nesting means are buckets, slats, or cleats.

6. A conveyor system as in claim 3 wherein said nesting means are buckets, slats, or cleats.

7. A conveyor system for the transportation of loads from a first station to a second station, in which some of the loads have a first pattern of bottom protrusions and some of the loads have a different second pattern of bottom protrusions, with each load having forward and rear protrusions, the system comprising:

(a) a first conveyor including an endless belt having an outer transport surface, a drive roller and a driven roller, the belt being trained over said rollers;

(b) a plurality of spaced apart nesting means affixed to said belt transport surface; said nesting means forming first and second patterns corresponding, respectively, to said first and second patterns of bottom protrusion of said load;

(c) control means for controlling said drive roller to advance said belt to a selected pattern so that, at said first station, the forward nesting means of the selected pattern on said belt will engage and carry the forward protrusions of the said load and, upon further advance of said belt, the rear nesting means of said selected belt pattern will engage and carry the rear protrusions of said load;

(d) a second conveyor essentially similar in construction to said first conveyor, said second conveyor having a roller positioned adjacent to, and spaced from, a roller of said first conveyor, and (e) a transfer surface between the said adjacent rollers of said first and second conveyors for transfer of said load from said first conveyor to said second conveyor.

8. A conveyor system as in claim 7 wherein said loads have bottom surfaces with front and rear fixed protrusions adapted for engagement into said nesting means.

9. A conveyor system as in claim 7 wherein said loads are wheeled carts and wherein the wheels of said carts define the protrusions which nest into said nesting means.

10. A conveyor system as in claims 7 wherein said nesting means are buckets, slats, or cleats.

11. A conveyor system as in claim 8 wherein said nesting means are buckets, slats, or cleats.

12. A conveyor system as in claim 9 wherein said nesting means are buckets, slats, or cleats.

13. A method for transportation of loads from a first station to a second station, in which some of the loads have a first pattern of bottom protrusions and some of the loads have a different second pattern of bottom protrusions, each of the load bottom protrusions having forward and rear protrusions, the method comprising:

(a) driving an endless belt having an outer transport surface, using a drive roller and a driven roller, the belt being trained over said rollers;

(b) engaging said protrusions in a plurality of spaced-apart nesting means affixed to said belt transport surface, the nesting means forming first and second patterns corresponding respectively, to and spaced in the same manner as said load first and second patterns, each of said belt patterns having forward and rear nesting means;

(c) and controlling said belt speed to advance said belt to a selected pattern so that, at said first station, the forward nesting means of the selected pattern on said belt will engage and carry the forward protrusions of said loads and, upon further advance of said belt, the rear nesting means of said selected belt pattern will engage and carry the rear protrusions of said load.

14. A method as in claim 13 wherein said loads are wheeled carts and the wheels of said carts define the protrusions which nest into said nesting means.

* * * * *